(12) United States Patent
Cotton

(10) Patent No.: US 11,367,088 B2
(45) Date of Patent: Jun. 21, 2022

(54) SYSTEM AND METHOD FOR PROVIDING DATA SCIENCE AS A SERVICE

(71) Applicant: JPMorgan Chase Bank, N.A., New York, NY (US)

(72) Inventor: Peter Cotton, Darien, CT (US)

(73) Assignee: JPMORGAN CHASE BANK, N.A., New York, NY (US)

(*) Notice: Subject to any disclaimer, the term of this patent is extended or adjusted under 35 U.S.C. 154(b) by 541 days.

(21) Appl. No.: 15/435,635

(22) Filed: Feb. 17, 2017

(65) Prior Publication Data
US 2018/0137525 A1 May 17, 2018

Related U.S. Application Data

(60) Provisional application No. 62/432,932, filed on Dec. 12, 2016, provisional application No. 62/420,861, filed on Nov. 11, 2016.

(51) Int. Cl.
*G06Q 30/02* (2012.01)
*G06N 5/04* (2006.01)
*G06N 20/00* (2019.01)

(52) U.S. Cl.
CPC .......... *G06Q 30/0202* (2013.01); *G06N 5/04* (2013.01); *G06N 20/00* (2019.01)

(58) Field of Classification Search
None
See application file for complete search history.

(56) References Cited

U.S. PATENT DOCUMENTS 8,600,858 B1 * 12/2013 Kamruddin ............ G06Q 40/06
705/35
9,165,477 B2  10/2015 Wilson
(Continued)

FOREIGN PATENT DOCUMENTS

AU   2013100314 A4 *  4/2013
WO   2015139119         9/2015

OTHER PUBLICATIONS

NPL Reference: Marcus, Adam and Parameswaran, Aditya. Crowdsourced Data Management: Industry and Academic Perspectives. Now: the essence of Knoweledge. Foundations and Trends in Databases. vol. 6, No. 1-2 (2013) 1-161. @2015. Doi 10.1561/1900000044. (Year: 2015).*

(Continued)

*Primary Examiner* — Patricia H Munson
*Assistant Examiner* — Nancy N Prasad
(74) *Attorney, Agent, or Firm* — Greenblum & Bernstein, P.L.C.

(57) ABSTRACT

The invention relates to a computer-implemented system and method for providing data science as a service (DSaaS) using a real time data prediction contest. The method may comprise the steps of presenting a consumer interface via a network that allows a data consumer to identify a subject data source having data fields that can be predicted; and presenting a participant interface via the network that allows a participant to select a competition in which to participate and provides a web services interface enabling the participant to provide web services that can be called by the web services interface. The web services provide a prediction of the at least one data field, and the web services are permitted to utilize external data sources in generating the prediction. The prediction can then be transmitted via the network to the consumer.

20 Claims, 11 Drawing Sheets

(56) References Cited

U.S. PATENT DOCUMENTS

| | | | |
|---|---|---|---|
| 9,710,767 B1* | 7/2017 | Dietrich | G06Q 10/063 |
| 2003/0023563 A1* | 1/2003 | Kutaragi | G06F 21/10 705/52 |
| 2010/0106674 A1 | 4/2010 | Mclean et al. | |
| 2015/0273342 A1* | 10/2015 | Olson | A63F 13/822 463/43 |
| 2016/0071017 A1* | 3/2016 | Adjaoute | G06Q 20/4016 706/52 |
| 2016/0232160 A1* | 8/2016 | Buhrmann | G06F 40/14 |
| 2017/0315791 A1 | 11/2017 | Mascaro et al. | |

OTHER PUBLICATIONS

Athanasopoulos, G. et al., The value of feedback in forecasting competitions, International Journal of Forecasting, 27(3):845-849 (2011).

Bennett, J. et al., The Netflix Prize, KDD Cup and Workshop, pp. 3-6 (2007).

Bentzien, J. et al., Crowd computing: Using competitive dynamics to develop and refine highly predictive models, (2013).

Bergstra, J. et al., Making a Science of Model Search: Hyperparameter Optimization in Hundreds of Dimensions tor Vision Architectures, ICML, pp. 115-123 (2013).

Buckheit, J. et al., WaveLab and Reproducible Research, Wavelets and Statistics 103:55-81 (1995).

Carter, Virgil et al., Optimal Strategies on Fourth Down, Management Science 24(16): 1758-1762 (1978).

Corchón, Luis C., The Theory of Contents: A Survey, Universidad Carlos III De Madrid, Economic Series 26 (Apr. 2007).

Dechenaux, E. et al., A survey of experimental research on contests, all-pay auctions and tournaments, Experimental Economics, 18(4):609-669 (2014).

Dietl, H.M. et al., Overinvestment in team sports leagues: A contest theory model, Scottish Journal of Political Economy 55(3):353-368 (2008).

Donoho, David. 50 Years of Data Science, R Software, p. 41 (2015).

Garrigues, P. et al., An homotopy algorithm for the Lasso with online observations, Advances in neural . . . , (1):1-8 (2008).

Genre, V. et al., Combining expert forecasts: Can anything beat the simple average? International Journal of Forecasting, 29(1):108-121 (2013).

Glauner, Patrick Oliver. Comparison of Training Methods for Deep Neural Networks, In arXiv preprint, pp. 1-56 (Apr. 2015).

Goodfellow, Ian et al., Generative Adversarial Nets, arXiv preprint arXiv: . . . , pp. 1-9 (2014).

Guyon, Isabelle et al., A brief Review of the ChaLearn AutoML Challenge: Any-time Any-dataset Learning without Human Intervention, JMLR: Workshop and Conference Proceedings 64:21-30 (2016).

He, K. et al., Deep Residual Learning for Image Recognition, Arxiv.Org., 7(3):171-180 (2015).

Kaggie, Web Page <http://www.kaggle.com/>, 2 pages, Dec. 30, 2014, retrieved from the Internet Archive WayBack Machine <http://web.archive.org/web/20141230051023/http://www.kaggle.com/> on Jun. 6, 2018.

Kaufman et al., Leakage in data mining: Formulation, detection, and avoidance, KDD '11 Proceedings of the 17th ACM SIGKDD International Conference on Knowledge Discovery and Data Mining, pp. 556-563 (2012).

Khaleghi et al., Multisensor data fusion: A review of the state-of-the-art, Information Fusion (2012).

Kim, J., AutoML Challenge: AutoML Framework Using Random Space Partitioning Optimizer, ICML, AutoML Workshop, pp. 1-4 (2016).

Carpenter, J., May the Best Analyst Win, Science 331, pp. 698-699 (Jun. 2011).

Krawczyk et al., Ensemble learning for data stream analysis: A survey. Information Fusion, 37:132-156 (2017).

Kuhn, Max, Caret Package. Journal Of Statistical Software 28(5):1-26 (2008).

Lambert et al., Self-Financed Wagering Mechanisms for Forecasting. Group pp. 170-179 (2008).

Lange et al., A Parimutuel Market Microstructure for Contingent Claims. European Financial Management 11:25-49 (2005).

Li et al. The internet of things: a survey. Information Systems Frontiers 17(2):243-259 (2015).

Machete, Reason, Contrasting Probabilistic Scoring Rules. Journal of Statistical Planning and Inference 143(10):1781-1790 (2013).

Mansournia et al., Inverse Probability Weighting, BMJ 352:i189 (2016).

McKinsey & Company, Big Data:The next frontier for innovation, competition, and productivity. McKinsey Global Institute (Jun. 2011).

Lauter et al., Can homomorphic encryption be practical? Proceedings of the 3rd ACM workshop on Cloud computing security workshop—CCSW '11, pp. 113-124 (2011).

Osborne et al., On the LASSO and its Dual. Journal of Computational and Graphical Statistics 9(2):319-337 (2000).

Pedregosa, F. et al., Scikit-learn: Machine Learning in Python. Journal of Machine Learning Research 12:2825-2830 (2011).

Polikar, Robi, Ensemble Learning 1:1-34 (2012).

Schmidt, M. et al., Symbolic regression of implicit equations. Genetic Programming Theory and Practice 7:73-85 (2009).

Sheremeta, R., Contest design: An experimental investigation. Economic Inquiry 49(2):573-590 (2011).

Stolfo, S.J., Abstract: KDD Cup 1999 Data, The UCI KDD Archive (1999).

Sutton, R.S. et al., Reinforcement Learning:An Introduction, Learning 3(9):322 (2012).

Tana, M.G. et al., GMAC: A Matlab toolbox for spectral Granger causality analysis of fMRI data, Computers in Biology and Medicine 42:943-956 (2012).

Thakur, Abhishek, Rules for Selecting Neural Network Architectures for AutoML-GPU Challenge, JMLR: Workshop and Conference Proceedings 1:1-4 (2016).

Thornton, C. et al., Auto-WEKA: Combined Selection and Hyperparameter Optimization of Classification Algorithms, Proceedings of the 19th ACM SIGKDD international conference on Knowledge discovery and data mining—KDD (9 pages) (2013).

Tibshirani, R. et al., Strong rules for discarding predictors in lasso-type problems. Journal of the Royal Statistical Society. Series B: Statistical Methodology 74(2):245-266 (2012).

Tziralis, G. et al., Prediction Markets: an Extended Literature Review. The Journal of Prediction Markets 1(1):75-91 (2007).

Wang, M. et al., City Data Fusion: Sensor Data Fusion in the Internet of Things. International Journal of Distributed Systems and Technologies (IJDST) (2015).

Welling, M., Herding Dynamic Weights to Learn, Proceedings of the 26th Annual International Conference on Machine Learning—ICML, pp. 1-8 (2009).

Welling, M., Herding Dynamic Weights for Partially Observed Random Field Models. UAI, pp. 599-606 (2009).

Witten, D.M et al., New Insights and Faster Computations for the Graphical Lasso. Journal of Computational and Graphical Statistics 20(4):892-900 (2011).

Yang, H. et al., Online learning for group lasso. In Proceedings of the 27th International Conference on Machine Learning, pp. 1191-1198 (2010).

Numerai Master Plan, https://medium.com/numerai/numerais-master-plan-1a00f133dba9 (Oct. 13, 2017).

International Search Report and Written Opinion issued in corresponding International Application No. PCT/US2017/061020, dated Jan. 19, 2018 (9 pages).

Intellectual Property Office, Patents Act 1977: Examination Report Under Section 18(3), UK Patent Application No. 1906530.9, dated Sep. 30, 2021, pp. 1-2.

* cited by examiner

Figure 3

URL ⓠhttp://citibike.mobi/ — 410

| Attribute | Example | Type | Index? | Predict? | Attribute? |
|---|---|---|---|---|---|
| stationName | Franklin St & W Broadway | | ☑ | ☐ | ☐ |
| availableDocks | 5 | 01/01/72 | ☐ | ☑ | ☐ |
| totalDocks | 25 | int | ☐ | ☑ | ☐ |
| latitude | 0.71117416 | int | ☐ | ☐ | ☑ |
| longitude | -73.97032517 | | ☐ | a | ☑ |
| availableBikes | 20 | 06/25/83 | ☐ | ☑ | ☐ |

— 414

Submit — 416

Progress — 412

JP-Volume current leaderboard

| Name | Reputation | Score | Uptime | Share | Host | Buy Now | Exclude? |
|---|---|---|---|---|---|---|---|
| Neural42 | 9 | 0.13 | 99.5 | 23.4 | Domino | No | ☐ |
| Alexsa Black | 7 | 0.14 | 100 | 10.5 | JP Data Platform | $10000 | ☐ |
| Tim Degner | 0 | 0.15 | 89.2 | 8.5 | AWS | No | ☑ |
| Forest master | 5 | 0.15 | 100 | 6.6 | JP Data Platform | $500 | ☐ |
| Support Vector 6 | 7 | 0.16 | 80 | 4.4 | JP Data Platform | $500 | ☐ |
| Tim Boelaars | 7 | 0.172 | 100 | 4.4 | JP Data Platform | $2000 | ☐ |
| Tarry | 7 | 0.172 | 100 | 1.4 | JP Data Platform | Yes | ☐ |
| Mr Brown | 6 | 0.174 | 100 | 1.0 | AWS | No | ☐ |
| Predictero | 10 | 0.176 | 100 | 1.0 | Self | No | ☐ |
| Minoril | 10 | 0.177 | 99 | 1.0 | Self | No | ☐ |
| Excelsior | 8 | 0.177 | 99.4 | 1.0 | Domino | No | ☐ |
| BlackTw | 8 | 0.172 | 98.6 | 1.0 | Sciops | No | ☐ |
| Forward | 6 | 0.172 | 99.4 | 1.0 | Sciops | No | ☐ |
| Benchmark 1 | 5 | 0.18 | 99.4 | 1.0 | JP Data Platform | Free | ☐ |

Algorithm 1 Parimutuel aggregation
---

Wealth $w \leftarrow (1/I, \ldots, 1/I)$
Learning rate $\alpha$
repeat
$\quad P_{I \times J}$ such that $\Sigma_j P_{ij} = 1 \; \forall \; i$
$\quad q \leftarrow w^T P$ {Market clearing price}
$\quad Q \leftarrow [q, \ldots, q]$
$\quad R \leftarrow P/Q$ {Point-wise division}
$\quad \pi \leftarrow (0, \ldots, 1, \ldots 0)$ {One-hot event result}
$\quad w \leftarrow (1 - \alpha)w + \alpha w \circ R\pi$ {Payout}
until done

Figure 11

SYSTEM AND METHOD FOR PROVIDING DATA SCIENCE AS A SERVICE

RELATED APPLICATIONS

This application claims priority to U.S. Application No. 62/420,861, filed Nov. 11, 2016, entitled "System and Method for Providing Data Science as a Service," and U.S. Application No. 62/432,932, filed Dec. 12, 2016, entitled "Real-Time Crowd-Sourced Prediction and Control," both of which are hereby incorporated by reference.

FIELD OF THE INVENTION

The present invention relates generally to data science, and more particularly to a system and method for providing data science as a service (DSaaS) using data prediction contests.

BACKGROUND

There is widespread agreement that forecasting and predictive data analytics are paramount to most businesses' ability to compete in today's economy. Forbes has reported that ninety percent of CEOs believe big data will be as transformative as the internet. Many companies are facing significant challenges in adapting to a new world of lower margins, regulatory burdens, and increased competition from the technology sector. To compete effectively in most industries, companies need access to efficient research and data prediction capabilities.

Known approaches for conducting predictive data analytics suffer from some significant drawbacks. For example, a company having limited internal staff to generate predictive analytics may experience significant delays due to project backlogs, as such projects may run for months before yielding a useful result. There are known platforms, such as Kaggle (www.kaggle.com), that have tapped into external communities of data scientists for assistance. These platforms enable a sponsor to run historical data prediction contests to further statistical research. Using the so-called Common Task Framework, an historical data set is provided to participants and a well-defined scoring mechanism is used to compensate them based on the effectiveness of the predictive models they submit.

Historical data science contests, however, have a number of disadvantages. For example, due to inevitable cheating when historical data is used for competitions, the burden left with the data consumer after the competition has ended (including the need to port code), and the ephemeral relevance of the work, the historical data competition model is often not an effective approach. Historical data competitions also tend to be slow moving and thus they generally do not provide the sponsor of the project with a useful predictive model in an expedited time frame.

These and other drawbacks exist with known systems and processes.

SUMMARY

Exemplary embodiments of the invention provide a new style of prediction contest in which participants build models (e.g., published as web services) that respond in real-time to a sequence of questions of a pre-defined type. Successful ideas in machine learning can motivate design patterns for combinations of these real-time prediction contests, with an objective of furthering forecasting, industrial control and decision making in general.

According to one embodiment, the invention comprises a method of simultaneously crowd-sourcing both model selection and data gathering. The method may comprise: (a) transmitting a live stream of questions in a pre-defined format from a central server on behalf of a contest sponsor seeking real-time answers; (b) receiving real-time responses from a plurality of contributed web services generated by participants; and (c) recording answers in real time for offline or online scoring, aggregation of estimates, and deferred compensation to participants. A preferred embodiment of the invention comprises prediction of future values of a source of updating data.

In various embodiments, the invention relates to a computer-implemented system and method for providing data science as a service (DSaaS) using a real time data prediction contest. The method may be executed on a specially programmed computer system comprising one or more computer processors, electronic storage devices, and networks. The method may comprise the steps of: presenting a consumer interface via a network, wherein the consumer interface allows a data consumer to (a) identify a subject data source having data fields that can be predicted, (b) specify at least one data field to be predicted, and (c) specify timing constraints and cost constraints on the prediction of the data fields; presenting a participant interface via the network, wherein the participant interface (y) allows a participant to select a competition in which to participate and (z) provides a web services interface that enables the participant to provide web services via the web services interface, wherein the web services can be called by the web services interface, the web services provide a prediction of the at least one data field, and the web services are permitted to utilize external information sources in generating the prediction; and transmitting, by the consumer interface, the prediction to the data consumer via the network.

The invention also relates to computer-implemented system for providing data science as a service, and to a computer readable medium containing program instructions for executing a method for providing data science as a service.

Exemplary embodiments of the invention can provide a number of advantages to a business or organization in need of predictive data analytics. For example, the DSaaS system can provide an inexpensive but accurate way to predict any stream of data points by adopting the prediction protocol as described herein. The DSaaS system can improve quality and reduce costs for the system operator and its data consumers' business processes. The DSaaS system can take advantage of a significant and growing community of data scientists or other analysts or individuals who are willing to compete and build services that benefit the requesting data consumers. The DSaaS system can efficiently identify the most relevant machine learning, statistical algorithms, and relevant data for a given task, avoid time consuming in-house iteration, and reduce time to market. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3 shows an example of a data consumer interface of the DSaaS system according to an exemplary embodiment of the invention.

FIG. 4 depicts an example of a data consumer interface that allows a data consumer to specify the data fields to be predicted according to an exemplary embodiment of the invention.

FIG. 5 is an example of a data consumer interface that allows the data consumer to specify timing and cost parameters according to an exemplary embodiment of the invention.

FIG. 9 is an example of a leaderboard that ranks data science contests or participants by certain variables according to an exemplary embodiment of the invention.

FIG. 11 describes a process for parimutuel aggregation according to an exemplary embodiment of the invention.

DETAILED DESCRIPTION

Figure 1:
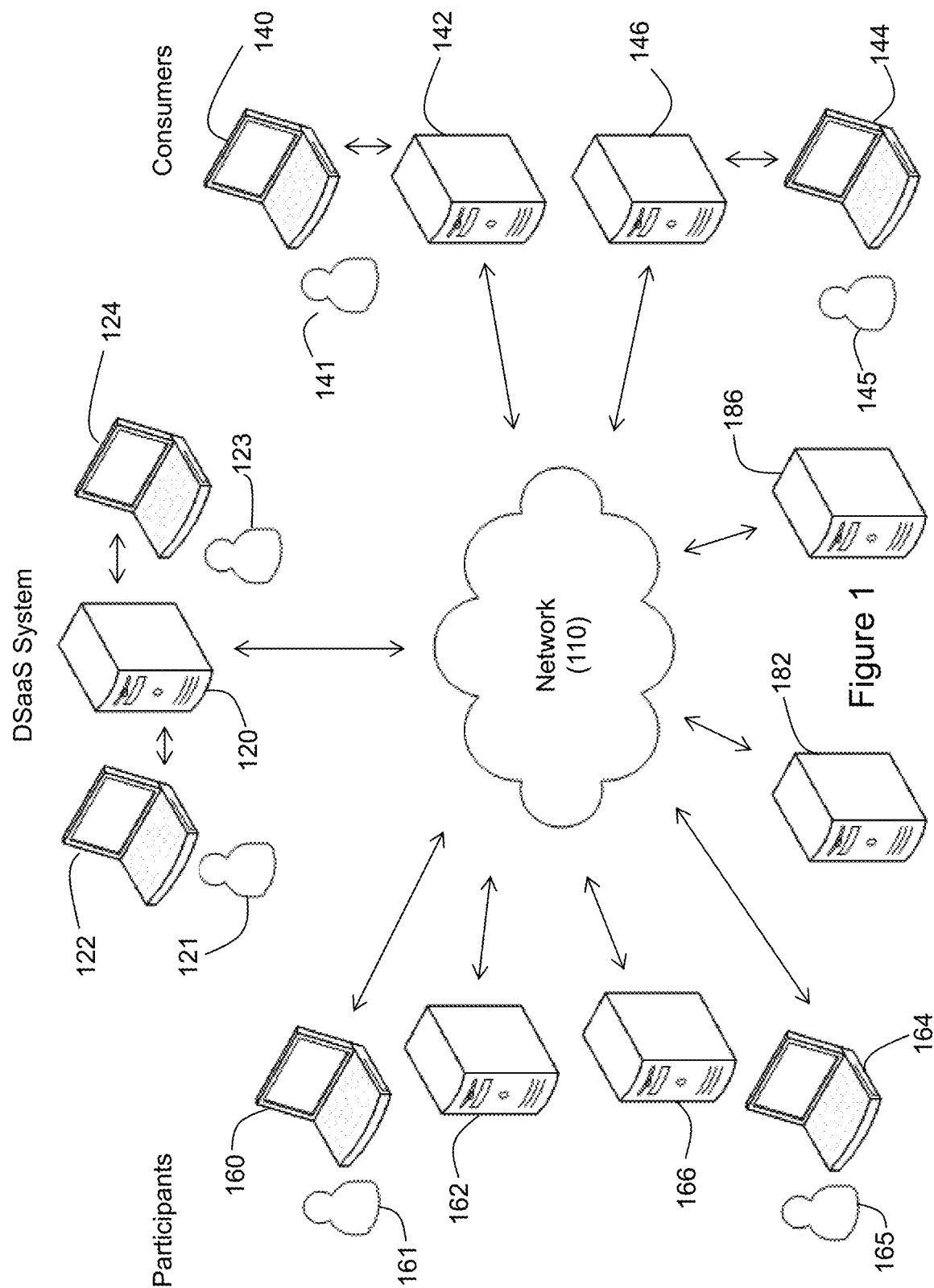
FIG. 1 is a diagram of a system for providing competitive data science as a service (DSaaS) according to an exemplary embodiment of the invention.

Exemplary embodiments of the invention will now be described in order to illustrate various features of the invention. The embodiments described herein are not intended to be limiting as to the scope of the invention, but rather are intended to provide examples of the components, use, and operation of the invention.

Initially, it is helpful to consider some principles of the operation of exemplary embodiments of the invention. One such principle is that data science and predictive data analytics often can be conducted more efficiently by searching for existing external data analytics resources (e.g., computer models) than by building analytics capabilities in-house. According to exemplary embodiments of the invention, data science can be procured efficiently via searching external resources in the space of computer models, meta-parameters, relevant correlated external data sources, data cleaning mechanisms, compute technologies, caching, state management and storage mechanisms, for example. Searching for and obtaining these components of predictive data analytics can provide significantly enhanced efficiencies as compared with developing comparable resources in-house. Forecasting and recommendations can be delivered by a large pool of talent, worldwide, rather than only by an organization's internal data analytics resources.

According to an exemplary embodiment, the invention outsources model searching by providing a data science as a service (DSaaS) system for real-time data science competitions. The DSaaS system can turn a significant liability of known historical data competitions (use of outside data, which permits cheating) into a key asset, by encouraging participants to discover relevant exogenous variables (e.g., external data sources) and use them. In addition, the DSaaS system according to exemplary embodiments of the invention encourages participants to deliver true value to data consumers by launching web services to answer a multitude (e.g., thousands) of questions the DSaaS system relays in real-time, but the DSaaS system provides these participants with a model deployment platform in which this additional step can be accomplished in an expedited time frame, e.g., in minutes.

The DSaaS system can create a new, efficient workflow that can be exploited by leading companies and organizations and their customers. In the short time frame (e.g., seconds) that may be allotted for a response, participants' bots can scrape company filings, utilize any number of resources on the programmable Web, search for correlated variables in public databases, or even poll for data from their drone. Businesses looking to optimize their operations can have a one stop shop in which forecast models tailored to their specific workflows can be developed in an expedited manner with high reliability and virtually zero or negligible time to market, for example. According to a preferred embodiment, all that is required from the data consumer is a sequence of questions and/or solutions. The DSaaS system can enable computer model search to go the way of internet search, i.e., enabling it to be simple, inexpensive and immediate for the data consumer.

The DSaaS system can provide an inexpensive but accurate way to predict any defined data points by adopting a "prediction protocol." The DSaaS system can improve quality and reduce costs for the system operator and its data consumers' business processes. The DSaaS system can take advantage of a significant and growing community of data scientists or other analysts or individuals who are willing to compete and build services that benefit the requesting data consumers. The DSaaS system can efficiently identify the most relevant machine learning, statistical algorithms, and relevant data for a given task, avoid time consuming in-house iteration, and reduce time to market.

According to a preferred embodiment of the invention, the DSaaS system can provide these advantages because, in part, it includes a front end interface making the system accessible and user-friendly to data consumers and participants having little or no computer programming expertise. Working with data science platforms, the DSaaS system makes it easy for data scientists (participants) to launch a REST API service, for example, which receives, manipulates and responds to questions using algorithms they develop themselves. The participant finds a question/answer stream of interest on the system's participant interface and devises an approach. The participant writes a function in a language such as Python, R, Octave or Julia that takes a standardized question and returns an answer. The participant interface allows the participant to easily back-test the function and launch the web services. The DSaaS system pays the participant a stream of income if the participant rises up the leaderboard, thus demonstrating the utility of the offered solution. The DSaaS system can be configured to allow a participant to offer to sell intellectual property rights to his or her algorithms and code to the data consumer or to other participants. This feature allows a participant to monetize his or her cash flows immediately. It may also satisfy certain transparency requirements of sponsoring data consumer institutions and their regulators.

Referring now to the drawings, FIG. 1 is a diagram of a system for providing data science as a service (DSaaS) according to an exemplary embodiment of the invention. As shown in FIG. 1, the system may include one or more networks and one or more computing devices, such as servers and personal computers. The DSaaS system may be operated by a business, a data science company, or other type of organization that seeks to identify requests for data science contests or predictive data analytics from its "data consumers," solicit data science solutions (e.g., predictions of certain identified data fields) from a community of "participants" (e.g., data scientists, analysts, or other individuals), and provide some or all of those solutions to its data consumers.

As shown in FIG. 1, the DSaaS system may be embodied primarily in a server 120 owned and/or operated by the company or organization providing the service (the "DSaaS provider"). The server 120 may be operated by a data science contest manager 121 at the DSaaS provider using a personal computing device such as a laptop computer 122. The manager 121 may be responsible for executing a particular data science contest or series of contests. The server 120 may also be accessed by one or more data analysts 123 using their personal computing devices such as laptop computer 124. The data analyst 123 may access the DSaaS system and associated data and results to evaluate the accuracy and utility of various predictive models or results provided by participants in a data science contest, for example.

The DSaaS system 120 communicates with other systems via a network 110 as shown in FIG. 1. The network 110 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example.

Also shown in FIG. 1 are servers and personal computing devices of data consumers. The data consumers may be businesses or other organizations that need data predictions and predictive data analytics delivered to them in a cost effective and timely manner, such as business intelligence, financial predictions, scientific predictions, and/or automation. There are many examples of businesses or organizations that are data consumers. One particular example might be a financial institution that needs to predict the trading volume of a security such as a particular bond over a future period of time. Other examples may include an electric utility that needs to predict demand for electricity during various defined future time periods, an online retailer that needs to predict demand for various products and services it offers during defined time periods, a bicycle sharing service such as www.citibikenyc.com that has a need to predict the number of bikes available at various stations, and a business that needs to predict sales conditional on a hypothetical choice of price. In the latter example, an objective of the business would be to capture the price optimization category, such as predicting movie sales according to discounts offered, hotel room bookings according to price, or even the number of candy bars sold by a vending machine conditional on a hypothetical choice of price.

FIG. 1 depicts two such data consumers. A first data consumer such as a retailer may have an analyst 141 who interacts with the DSaaS system 120 via a personal computing device 140 and corporate server 142, for example. A second data consumer such as a bicycle sharing service may have an analyst 145 who interacts with the DSaaS system 120 via a personal computing device 144 and corporate server 146. Many other examples of data consumers and types of predictive data exist for different retailers, service providers, financial institutions, healthcare providers, government agencies, and other organizations and individuals.

FIG. 1 also depicts participants who provide data science solutions, modeling, and/or predictions to the DSaaS system according to exemplary embodiments of the invention. The participants may be data scientists, analysts in a particular industry, or simply individuals who have knowledge or experience in predictive data analytics and who are interested in providing proposed solutions (e.g., predictions of certain data fields) to the DSaaS system in exchange for potential compensation based on the effectiveness of their proposed solution or data prediction. FIG. 1 depicts a first participant 161 who may interact with the DSaaS system via their personal computing device 160 and the network 110, for example. The first participant 161 may also arrange to make his or her predictive analytic solution continuously available by uploading it to a server 162, e.g., a cloud server of a cloud computing service such as Amazon Web Services (AWS). FIG. 1 depicts a second participant 165 who may interact with the DSaaS system via his or her personal computing device 164 and the network 110. The second participant 161 may also arrange to make his or her predictive analytic solution continuously available by uploading it to a server 166.

Also shown in FIG. 1 are two third party servers 182 and 186. The third party servers 182, 186 represent external data sources that participants can draw upon and incorporate as input to their models. For example, the participant 165 may create a web service that predicts the number of bicycles available at a particular bike sharing station. As part of his or her solution, the participant may create a REST API that automatically queries weather station data maintained by a third party server 182 (because the weather may influence the likelihood that people will rent bikes). The participant may also create a REST API that automatically queries traffic data maintained on another third party server 186 (because heavy traffic may influence the likelihood that people will rent bikes). The participant can therefore improve his or her predictive capability by drawing upon third party data using an appropriate interface and query.

Those skilled in the art will appreciate that exemplary embodiments of the invention can be utilized to provide data science as a service to a wide variety of data consumers starting with a large community of participants and is not limited to the examples set forth herein. In addition, the diagram shown in FIG. 1 is merely one example of a DSaaS system configuration and its interfaces with other systems and is not intended to be limiting. Those skilled in the art will appreciate that other types and configurations of networks, servers, databases and personal computing devices (e.g., desktop computers, tablet computers, mobile computing devices, smart phones, etc.) may be used with exemplary embodiments of the invention.

Figure 2:
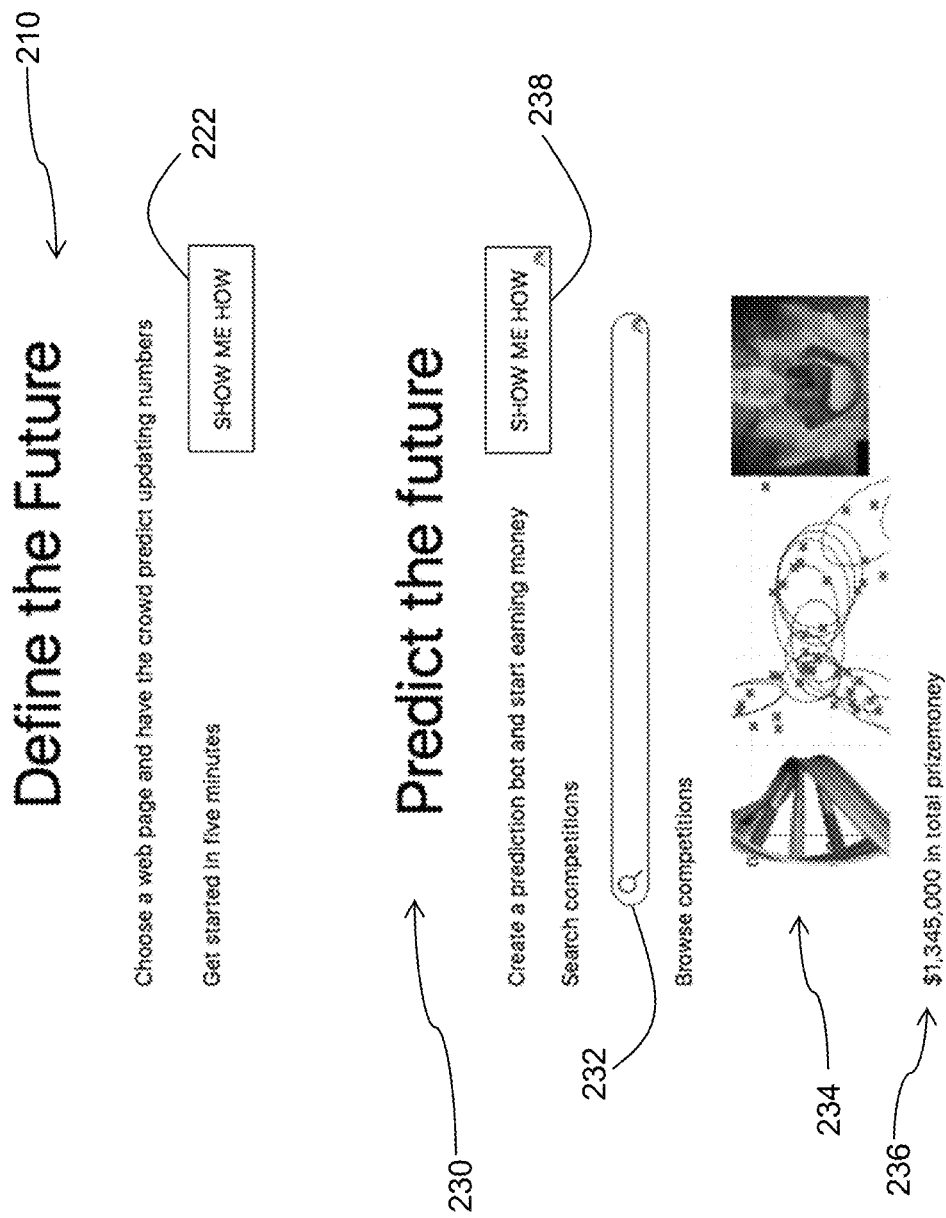
FIG. 2 illustrates an example of landing web page for the DSaaS system according to an exemplary embodiment of the invention.

FIG. 2 illustrates an example of a landing web page of the DSaaS system providing an interface between the DSaaS system, the data consumers and the participants. As shown in FIG. 2, a data consumer may begin under the header entitled "Define the Future" where the web page or software application ("app") indicates that the consumer can choose a web page or other subject data source that updates and have the crowd (participants) predict updating numbers. The data consumer can click on the button 222 entitled "SHOW ME HOW" to get started.

The participant, such as a data scientist, analyst, or individual, can get started under the heading entitled "Predict the future" 230. The web page or app indicates that the participant can create a prediction bot and start earning money. It also includes a search bar 232 to search available data competitions, a number of icons 234 that the participant can click on to browse various available data competitions, and an indication 236 of the total amount of prize money available. The web page also includes a button 238 entitled "SHOW ME HOW" to enable the participant to obtain detailed information on the rules and resources available for participating in a data science competition.

Figure 3:
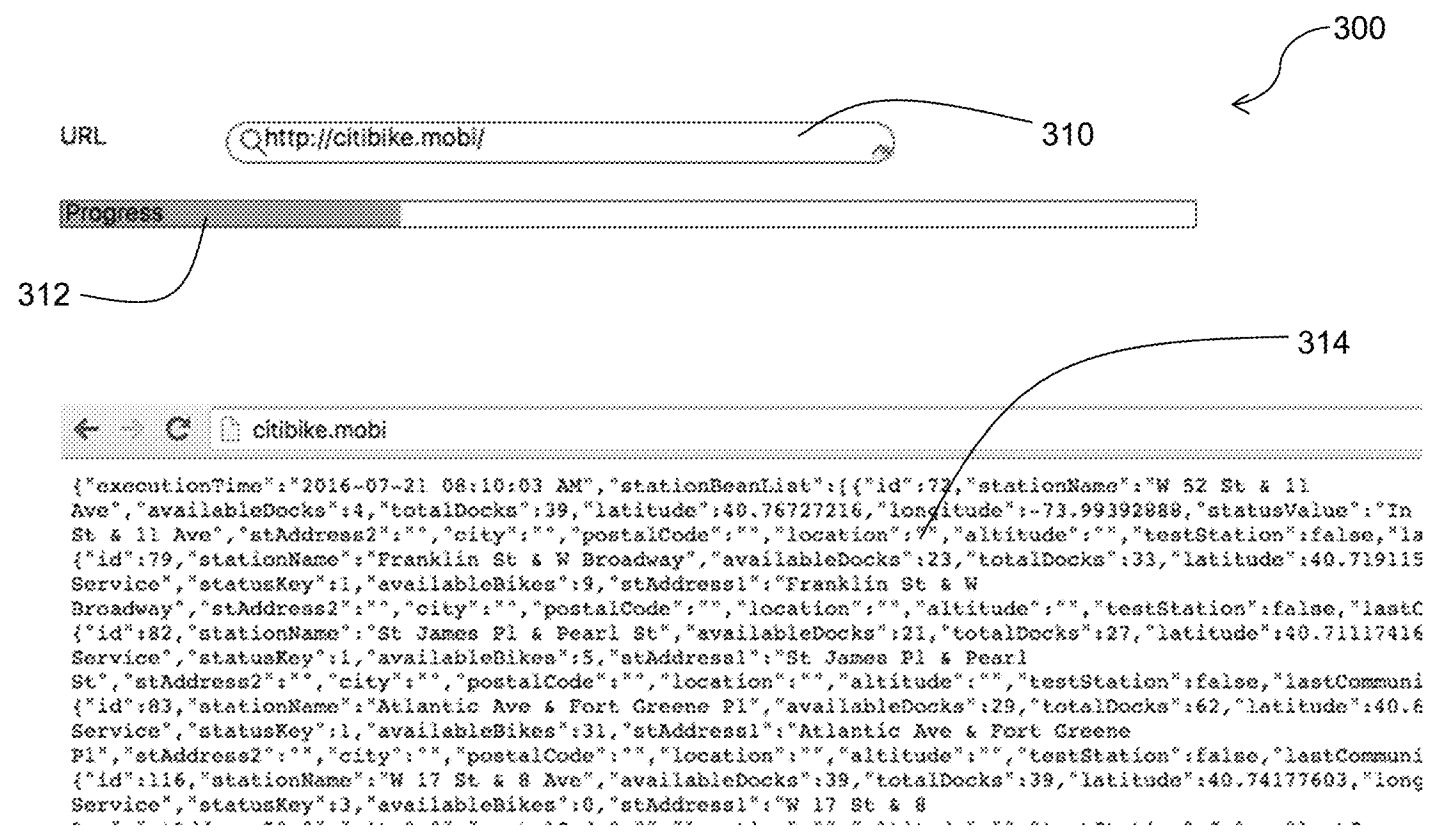

If the data consumer chooses to proceed with defining the data it would like to have predicted by various participants, the data consumer can begin, for example, by identifying a subject data source containing the one or more data fields to be predicted. The subject data source may comprise any identifiable data source such as a website or a table in a database, for example. The subject data source may include data fields that are updated periodically, according to a preferred embodiment of the invention. The data consumer may identify the subject data source with an address, e.g., by inputting a uniform resource locator (URL) for a website that includes the data fields to be predicted. FIG. 3 illustrates an example of a consumer interface 300 provided by the DSaaS system as a web page or app in which the consumer has identified http://citibike.mobi/ in the address bar 310 for the URL. The consumer interface 300 also includes a progress bar 312 that illustrates for the data consumer how far along he or she is in the process of defining the data fields to be predicted. One of the advantages that various embodiments of the invention can provide is a process that is simple and expedient for both the data consumer and the participant, thus enhancing the likelihood that data consumers and participants will use and rely on the DSaaS system.

FIG. 3 illustrates an example of the structured data 314 (JSON in this example) that is provided by the subject data source. In this example, the Citibike website broadcasts the number of available bikes and free bike docks at New York City bike stations, together with static attribute data such as the name, latitude and longitude of the bike station. This web page is public and maintained by the bike sharing program in order that developers can access the data in a convenient programmatic manner. The page updates at regular intervals, approximately every minute, and thus provides real-time time series data of interest to a large number of interested parties. Typically, the current value of this data would be consumed by application developers, but according to exemplary embodiments of the present invention, a substantially identical page is maintained by the DSaaS system comprising future estimates of these quantities, e.g., 15, 30, 60, and/or 90 minutes in the future. The predicted data is made available to the data consumer that requested it, according to the format, content, interface, and timing requirements specified by the data consumer according to one embodiment of the invention. The data consumer pays compensation to the DSaaS system that it agreed to pay when requesting the predicted data. The DSaaS system compensates the participants based on the quality score of their predictions, as will be discussed further below.

FIG. 4 depicts an embodiment of a consumer interface 400 provided by the DSaaS system according to an exemplary embodiment of the invention. As shown in FIG. 4, the website containing data fields to be predicted is the Citibike website that is used to manage the bike share program in New York. The consumer interface 400 includes an address bar 410 in which a consumer can specify an address such as a URL or other identifier of the data source containing the one or more data fields to be predicted. The consumer interface 400 includes a progress bar 412 showing the relative progress of the consumer in defining the data fields to be predicted.

The consumer interface 400 also includes a table 414 that lists one or more attributes, examples of the attributes, data types for each attribute, and check boxes to allow a consumer to indicate whether the attribute is an index value, a value to be predicted, or an attribute that is fixed. In this example, the table 414 provides the attributes, including station name, number of available docks, total number of docks, latitude and longitude of the station, and the number of available bikes. The website allows the data consumer to specify with check boxes which data fields are to be predicted, which data fields are attributes, and which data fields constitute an index. In the example shown in FIG. 4, the data consumer has used the check boxes to specify that the station name (Franklin St & W Broadway) is to be used as the index, the latitude and longitude are to be treated as attributes, and the available docks, total docks, and available bikes are the data fields to be predicted. Once the data consumer has assigned these designations, he or she can click the submit button 416 to submit the designations to the DSaaS system. As can be observed from FIG. 4, the process that a data consumer undertakes to choose a subject data source of interest and to define the data fields to be predicted in that subject data source can be completed in a short time frame and is easy to understand. This enhances the likelihood of use of the DSaaS system by potential data consumers who are not necessarily tech savvy or well versed in computer languages.

Figure 5:
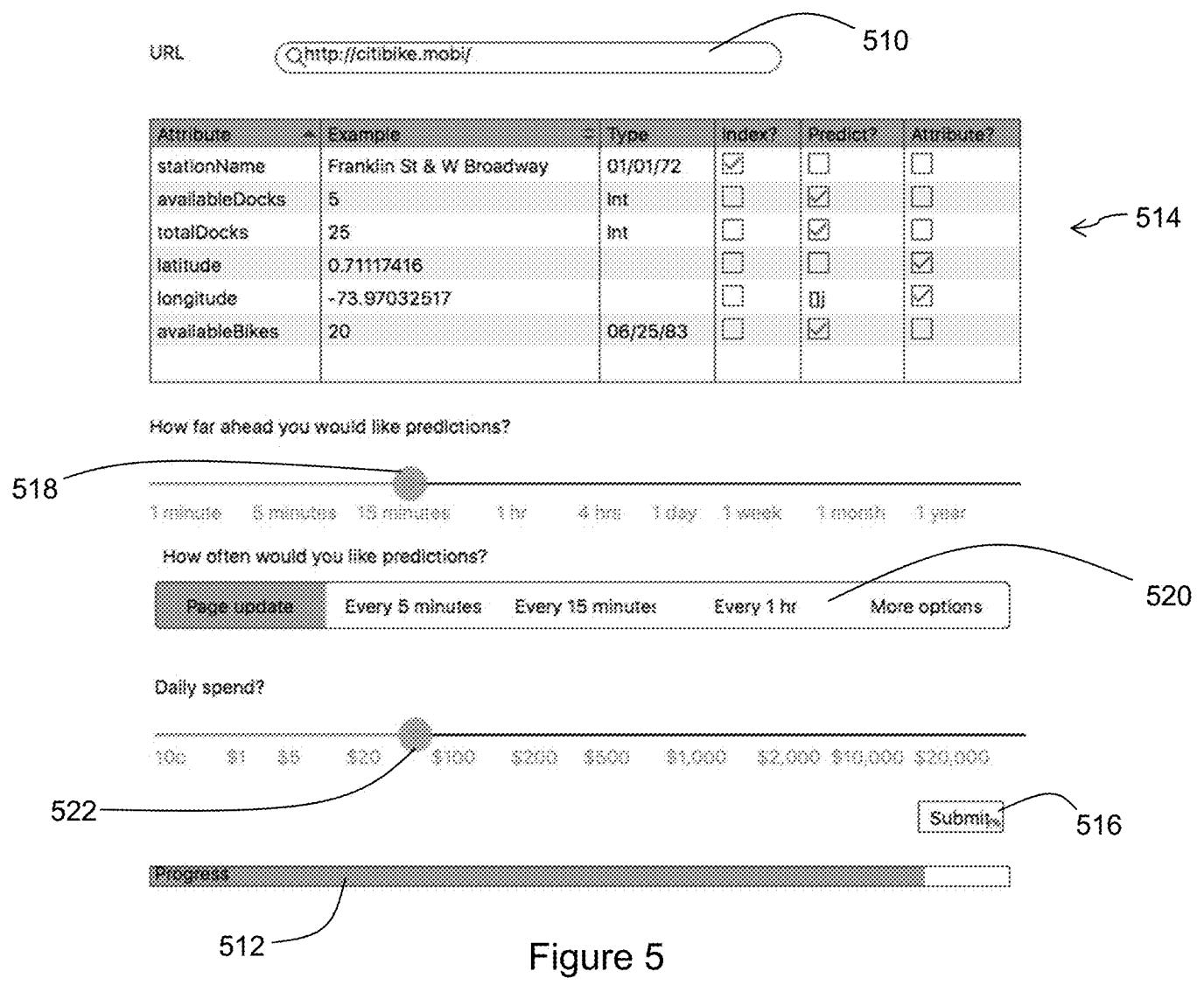

Referring to FIG. 5, in addition to the address bar 510, the progress bar 512, and the table 514, the DSaaS system allows the data consumer to define the desired data predictions with additional parameters and constraints. For example, the consumer interface 500 includes a sliding button 518 that allows the data consumer to specify how far into the future the data consumer would like the data predictions. Multiple buttons 518 can be included to request predictions at multiple points in the future. The interface 500 includes a button bar 520 that allows the data consumer to specify how often the page should be updated. The consumer interface 500 also allows the consumer to indicate with a sliding button 522 the amount of money it is willing to pay per day for access to the data predictions it has requested. Once the data consumer is happy with the selections, he or she can click on the submit button 516.

Figure 6:
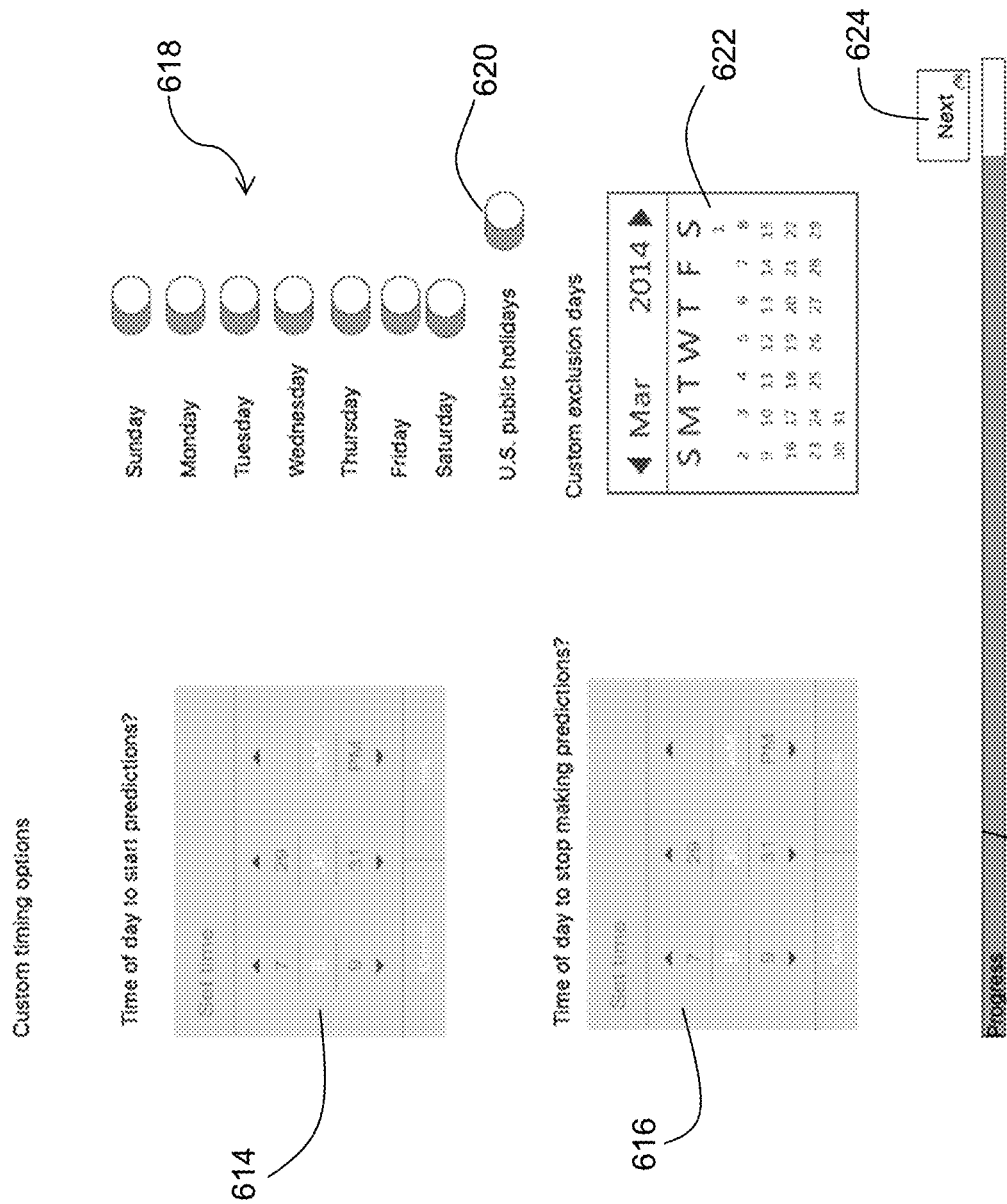
FIG. 6 depicts an example of a data consumer interface of the DSaaS system that allows the data consumer to specify additional timing parameters according to an exemplary embodiment of the invention.

FIG. 6 is an illustration of a consumer interface providing additional functionality to further define the predictions that are desired. As shown in FIG. 6, the consumer interface provided by the DSaaS system allows the consumer to specify custom timing options, such as the time of day to start predictions 614, the time of day to stop making predictions 616, the days of the week to make predictions 618, whether to make data predictions on US public holidays 620, and custom exclusion days 622. The data consumer can click the "Next" button 624 after making his or her selections. The data prediction needs defined by the data consumer using the consumer interface may be used by the DSaaS provider to create a data science contest. Using the functionality shown in FIGS. 3-6, the data consumer is able to quickly and easily indicate in detail the data fields it would like to see predicted, the exact times during which predictions are desired, and the amount of expenses it is willing to pay per day.

As explained above, in an exemplary embodiment of the present invention, a non-programmer can specify quantities to be predicted by the crowd (participants) in a manner that does not require programming. This is because web pages or other sources of updating data (often but not always in tabular format) are implicitly time series. However, not all of the numbers, strings, categorical or other data reported on said sources of data need be the target for prediction. Some data, as with the name of a Citibike location, is a static attribute and can be considered a way of indexing (parametrizing) the precise question to be asked. Other data, such as the latitude, is considered ancillary information—possibly of interest or use to forecasting but not essential to the definition of the task for the crowd. In an exemplary embodiment a non-technical user can be guided through a dialog, as indicated in 414, in order to instruct the system which quantities are to be predicted, which are to be used to index distinct predictions, and which are merely ancillary attributes. Furthermore in 518 and 520 a means of interrogating the user for forecast horizon and times at which predictions should occur is shown and in this example the data consumer is instructing the DSaaS system that they wish to trigger predictions every time the page updates and that contestants (participants) should be judged based on the values shown in the page fifteen minutes henceforth from those trigger times. It will be apparent to one skilled in the art that other means of soliciting these preferences are possible. Furthermore, in FIG. 5, element 522, an embodiment of a slider is illustrated by which the data consumer determines how much money to spend on a per diem basis. Furthermore, in FIG. 6, examples of additional customizations a data consumer might achieve are provided, again without programming. For instance, with 614 and 616 used in conjunction, the data consumer user is able to instruct the system that they are only interested in predictions between a supplied start time and end time of day. Furthermore, in 618, 620 and 622 the data consumer is able to instruct the system of weekday, holiday and day of month preferences, thus allowing them to run the contest on only Sundays, for example. It will be apparent to one skilled in the art that other ways of providing scheduling information are possible, including the provision of a dialog box permitting the user to enter terse but more powerful scheduling syntax such as the CRON format.

Figure 7:
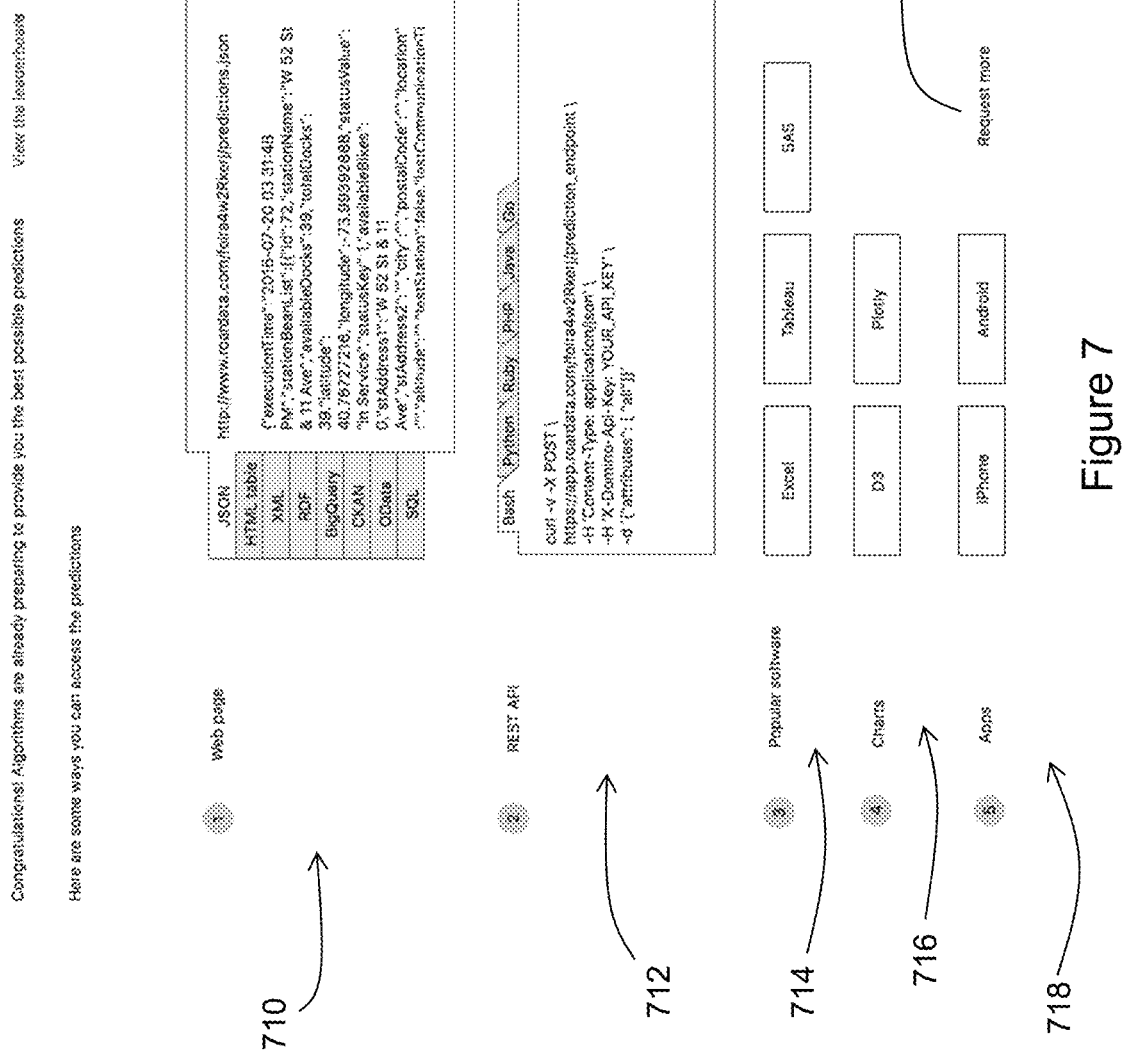
FIG. 7 is an example of a data consumer interface that provides a number of interface options for web services provided by participants according to an exemplary embodiment of the invention.

After the data consumer has defined a data science contest, the DSaaS system can provide the data consumer with information that assists him or her with obtaining and using the results of the data science contest when they begin to be available. FIG. 7 shows one example of the type of information that the DSaaS system can provide to the data consumer. As shown in FIG. 7, the DSaaS system includes a consumer interface that has a number of different methods/interfaces for accessing the results of the data science contest. For example, the data consumer may access the results via web page 710, REST API 712, commercially available software 714, charts 716, and apps 718. Web page access may be provided using languages such as JSON, HTML table, XML, RDF, BigQuery, CKAN, OData and SQL, as shown in FIG. 7. REST API access may be provided using languages such as Bash, Python, Ruby, PHP, Java and Go. Popular software may include Excel, Tableau, and SAS. Available charts may include D3 and Plotly. iPhone and Android apps may also be provided. The consumer interface may also include a button 720 allowing the data consumer to submit a request to the DSaaS system for additional interfaces. By providing a wide selection of interfacing technologies, the DSaaS system provides many options to a data consumer for automatically interfacing to solutions provided by the DSaaS system. The data consumer can program its own systems (e.g., 142, 146 in FIG. 1) to call or query the DSaaS system 120 at predetermined times using such interfaces.

It will be apparent to those skilled in the art that standard examples of accessing web based data in different programming languages can be automatically generated and further customized for convenience of use. It should be furthermore apparent to one skilled in the art that a software application on a phone, tablet or personal computer can use the interfaces exposed in 710 or 712 and thereby allow a user to ask a question and receive an answer. For example an app on a mobile phone might ask a user to select a bike station, or suggest a bike station based on location, and report forecast results arrived at according to exemplary embodiments of the invention. Thus, one advantage that can be provided by exemplary embodiments of the invention is that the data consumer can easily specify the content, format, interface, and/or specific timing requirements of the data predictions that it is requesting. This ability to specify in detail the requested data reduces the data consumer's workload in using such data or incorporating such data into its business operations.

Figure 8:
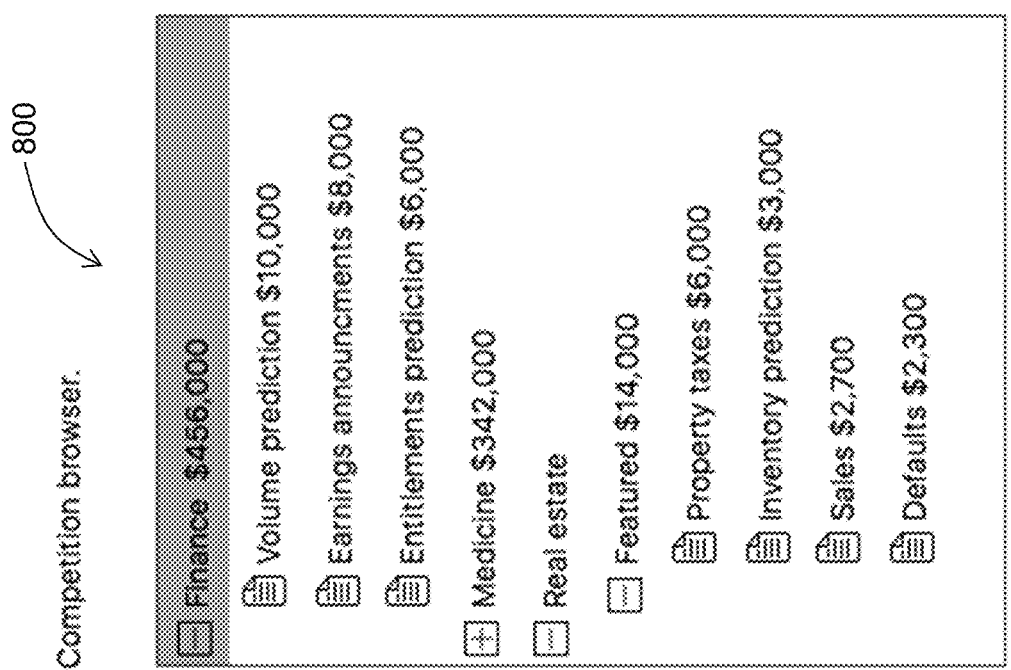
FIG. 8 illustrates an example of a competition browser for a participant interface according to an exemplary embodiment of the invention.

Turning now to the perspective of the participant (e.g., data scientist, analyst, or individual), the DSaaS system may publicize the data science contest on a participant interface so that the community of participants has the ability to begin devising models and producing web services that are responsive to the data science contest. FIG. 8 illustrates an example of a competition browser that is part of the participant interface. The competition browser lists data competitions that are available to participants wishing to submit proposed solutions (e.g., predicted data derived from software models). The competition browser 800 may be configured to provide a list of categories and subcategories of data competitions. For example, as shown in FIG. 8, the categories may include Finance, Medicine and Real Estate. Under each category may be listed at least one level of subcategories. For example, under the Finance category is listed Volume prediction, Earnings announcements and Entitlements prediction. Similar subcategorization is shown in FIG. 8 for the Real estate category. Additional levels of subcategorization may also be implemented. The competition browser 800 may also show the amount of prize money available for each category and subcategory. This configuration allows potential participants to easily identify competitions in which they may be interested in submitting a response based on subject matter and potential income.

Once a participant selects a data science competition in which to participate, he or she can then begin to create a web service that automatically interfaces to the DSaaS system to provide predictions at predetermined times and/or in response to queries from the DSaaS system. The DSaaS system preferably includes a web services interface that is a component of the participant interface and that makes the DSaaS system accessible and user-friendly to participants. Participants can launch web services and begin generating real-time responses using data science platforms, technologies, and standard model deployment tools such as Domino Data Lab (www.dominodatalab.com), APISpark (https://restlet.com/products/apispark/), Amazon Web Services (aws.amazon.com), Eve (python-eve.org), Octopus Deploy (https://octopus.com/), Yhat (www.yhat.com), Apiary (https://apiary.io/), Deployd (http://deployd.com/), Azure (azure.microsoft.com), and Google (cloud.google.com), for example.

According to one embodiment, the participant uses RESTful web services to provide his or her predictions of the data field(s) as requested by the data consumer. The web service may comprise a REST API service that receives, manipulates, and responds to queries using a software-based model developed by the participant. The participant finds a question/answer stream of interest on the DSaaS system's participant interface and devises an approach, e.g., builds a software model or function. The participant may write a function or model in Python, R, Octave, Julia, or other programming language, for example, that takes a standardized question and returns an answer.

The RESTful web services may utilize an http protocol, for example. The web services can employ a software-based model and can be hosted by the participant and identified by a uniform resource identifier (URI) or uniform resource locator (URL). The web services can also be programmed to call other web services (e.g., third party data services provided via a third party server) in use of the software-based model. The web services provide the prediction of the at least one data field in real time or near real time to the DSaaS system.

The participant can back-test the function or model underlying the web services with one click according to an exemplary embodiment of the invention. For example, the web services interface that is a component of the participant interface may allow the participant to identify the web services with a URL and to back-test the function on a known data set by pressing a "back-test" button. This functionality allows the participant to more easily evaluate the accuracy of his or her model prior to submission of data predictions to the DSaaS system. The participant can also launch the web service with one click according to an exemplary embodiment of the invention. For example, after the participant is satisfied with the model's performance, he or she can click a "submit" button on the web services interface to allow the web services interface to thereafter call the participant's web services using a predefined protocol. As will be appreciated by those skilled in the art, the foregoing features of the web services interface allow a participant with a basic understanding of computer programming to build, test and submit web services to the web services interface.

According to preferred embodiments of the invention, the participants are permitted to use third party data sources in providing their web services. This feature can provide significant advantages over known historical data science competitions in which the training data and test data are carefully defined and limited. According to exemplary embodiments of the invention, the participant can identify and use external data sources in innovative ways to improve the performance of his or her predictive model. That is, the participant can provide web services that provide predictive data that is generated with both (1) a model or function created by the participant and (2) one or more external data sources identified by the participant that are used as input to the model. Thus, the DSaaS system obtains the benefits of external models created by participants as well as innovate identification and use of external data sources used in the participants' models. The external data sources fed into the model can also provide the benefit of real time information for more accurate predictions.

According to another embodiment of the invention, the participants who provide the web services also manage other aspects of the model and input data. For example, unlike an historical data competition in which the participant simply provides a completed model, according to exemplary embodiments of the invention the participant creates the model, hosts the model, finds and uses external data sources, maintains and improves the model and data sources, manages related aspects of the process such as data storage, and uses the model and data to provide web services that provide predicted data in real time or near real time to the DSaaS system upon request or at predetermined times. The participant, after using and observing the model over time, may modify the model to improve its accuracy, or may change the input data sources. For example, the participant may reevaluate the relevance of the model or components of the model, may change the model computations, or may otherwise maintain the model over time. The participant may also make certain decisions regarding the type and amount of data to store for the model and how and where to store the data, including considerations as to data compression and state management.

The participant also has the ability to combine and reuse models according to exemplary embodiments of the invention. According to one example, the participant may utilize a software model that has been previously used in a data science competition, e.g., an historical data science competition in which only a defined, public data set is permitted to be used and no external information sources are permitted to be used. The participant may also combine different models to improve predictive performance, such as by calling other models with web services, as will be discussed further below. According to other embodiments of the invention, the participant's web services can be designed to automatically search for relevant third party algorithms to be used in providing the data predictions to the DSaaS system.

According to another aspect of the invention, the participants can design the web services so that they provide forecasts for a plurality of contingent scenarios. Real-time competitions can be used to assess action-conditional outcomes. According to this embodiment, the participants predict the results of every action that might be taken, and choose the best action. The result of that action should be quantifiable. One example is baseball pitch selection. Assume it is the bottom of the ninth inning. The away team holds a one run lead, but the home team has a man on second base with one out. The count is full. The last pitch was a successful high fast ball. What pitch should come next? An answer may be supplied by the crowd (i.e., the participants), not the catcher. In an action-conditional competition, the participants submit multiple probability estimates of a game win, one for each possible pitch. The collective forecasts may aggregated separately for each possible action using aggregation methods described below. The crowd concludes that throwing a curveball will result in the highest probability of winning the game (e.g., multiple participants submit their predictions, and the DSaaS system calculates and aggregated answer). The pitcher takes the advice. The batter strikes out. The process is then repeated for the next pitch, which calls for the next real time question to the web services, and so forth. Accordingly, exemplary embodiments of the invention can be used to make real-time decisions based on forecasts for a plurality of contingent scenarios.

According to another aspect of the invention, the data predictions from a number of participants can be aggregated to provide an improved prediction. In this embodiment, the DSaaS system records all predictions made by all participants and performs both an allocation of points to participants (governing subsequent payments made to them—this is done ex post when the true quantities are revealed by the passage of time) and an aggregation of forecast opinion into a single number or collection of numbers. In an exemplary embodiment, both the scores allocated to participants pertaining to a fixed time interval and the weights used to combine participants' forecasts into a single forecast coincide, and are equal to the inverse of the mean square error of participants' entries. Other aggregation methods can be used to aggregate data provided by multiple participants according to an exemplary embodiment of the invention, as will be discussed further below. In fact, the aggregation method itself can be the subject of a data science competition.

In another embodiment, participants supply probabilities for a finite number of discrete, mutually exclusive and collectively exhaustive outcomes. In this embodiment the weights assigned to participants' forecasts are initially equal, but thereafter are adjusted up or down based on a scoring system modeled after the pari-mutuel system employed at racetracks. In this embodiment it is initially assumed that participants' weights are synonymous with wealth and that they bet a fraction of their wealth equal to their forecast probability on each of the outcomes. Then, the total wealth is reassigned back to participants in proportion to their investment only in the one outcome that was realized. The parimutuel system will be described in further detail below. It will be apparent to one skilled in the art that there are other ways of aggregating forecasts and allocating scores, such as methods in which scoring rules can be designed to solicit probabilistic opinions or point estimates.

FIG. 9 is an example of a leaderboard that can be generated and provided by the DSaaS system as part of the participant interface. The leaderboard 900 lists the names of the leading data science contests in a particular data science competition. The leaderboard 900 also provides related information for each data science contest, such as reputation (a measure of a participant's overall performance in all contests, not just the current contest), score (for the current contest over the current time window—for instance going back one month), uptime (the percentage of questions they have answered during said time), share (of total compensation paid out), host (the location where participant's solution resides), "buy now" (the participant's decision whether to sell its IP rights to its solution), or exclude (a check-box the sponsor of the competition can use to ignore certain participants). The leaderboard can be configured to allow participants to sort the leaderboard by any of the foregoing variables. In the FIG. 9 example, the contests are ranked by share.

The DSaaS system can be configured to automatically make payments to participants, e.g., by direct deposit, PayPal deposit, or other payment process, based on a predefined criteria, such as the participant's score, the total amount of compensation authorized by the requesting data consumer, and the applicable time period. The payment terms, including amount, criteria, and timing for payments, are provided to each participant at the beginning of the data science competition according to a preferred embodiment.

Figure 10:
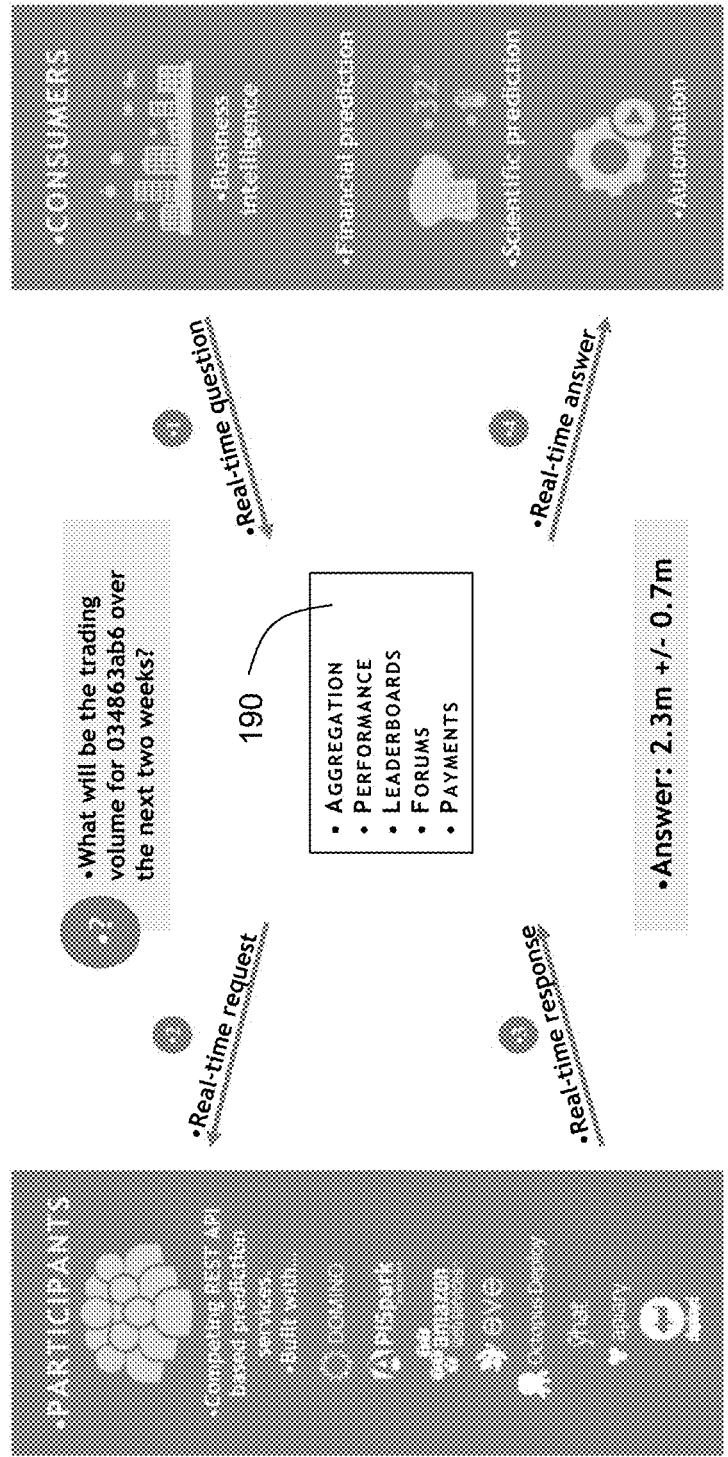
FIG. 10 is a drawing illustrating an example of the real-time provision of data science as a service according to an exemplary embodiment of the invention.

FIG. 10 is a drawing that depicts particular examples of use of the DSaaS system according to exemplary embodiments of the invention. In FIG. 10, the data consumers may include organizations in need of business intelligence, financial predictions, scientific predictions, and/or automation, for example. In this example, the data consumer is interested in obtaining a prediction of the trading volume for a particular bond (e.g., CUSIP 033863ab6) over the next two weeks. In step 1 shown in FIG. 10, the data consumer can submit this real-time question by identifying the website (subject data source) and data field where this data is posted using the consumer interface as described above. In step 2, the DSaaS system 120 makes a real-time request to participants by creating a data science contest and posting it on a competition browser, such as the one shown in FIG. 8. Participants can begin generating real-time responses using data science platforms and technologies such as Domino (www.dominodatalab.com), APISpark (https://restlet.com/products/apispark/), Amazon Web Services (aws.amazon.com), Eve python-eve.org, Octopus Deploy (https://octopus.com/), Yhat (www.yhat.com), Apiary (https://apiary.io/), and Deployd (http://deployed.com/), for example, as depicted in FIG. 10. Participants submit responses to the DSaaS system in step 3. The DSaaS system evaluates and processes the responses and provides a real-time answer to the data consumer in step 4.

As indicated in FIG. 10, element 190, the DSaaS system can provide other related functionalities, such as aggregation, performance, leaderboards, forums and payments. Aggregation refers to the process of combining participants' forecasts into a single number or other summary information (such as lowest quartile and highest quartile) as will be discussed below. Performance refers to calculation of a performance metric for each proposed solution submitted by a participant according to predetermined, agreed upon criteria. The performance metric may be used in calculating each participant's compensation for a particular data science contest. Some examples of the calculation of the performance metric (score) are discussed above. According to another embodiment of the invention, the method involves assigning a point to any participant finishing in the top decile. It will be apparent to those skilled in the art that other methods are possible and that this decision might be left to the data consumer. Leaderboards, such as the example shown in FIG. 9, provide data on the leading contests and may be ranked by different variables. Forums provide a communication platform whereby participants and data consumers can exchange ideas and data relating to data science competitions. Payments refers to the process executed by the DSaaS system for calculating and paying compensation to each qualifying participant based on the amount authorized by the requesting data consumer and the participant's performance metric described above.

Advantages of Real Time Data Prediction Contests. The following paragraphs discuss a number of advantages that can be provided by real time data prediction contests according to exemplary embodiments of the invention.

Real-time data prediction contests can merge the model selection capability of historical data contests with the strengths of live trading markets. However, there are typically two main challenges with real time contests. First, while the setup of real-time data prediction contests represents a much lower barrier to entry compared to existing live markets, it is a somewhat higher barrier than historical data contests. Participants in a real-time data prediction contest generally must maintain a real, live web service or by other means answer questions with little delay. However, participants are able to utilize various commercial and open source solutions that facilitate the implementation of a coded algorithm as a REST endpoint. Furthermore, the requirement that participants do more work (i.e., develop and maintain a model as well as exogenous data sets) is not, in and of itself, a drawback. An advantage of exemplary embodiments of the invention is that it allows participants to pass through more economic value to an end user of prediction than they are able to in a traditional historical data contest.

Another advantage of real time prediction contests is elimination of data leakage. In contrast to historical prediction contests, the answers to real-time contests lie in the future. This aspect of real-time data prediction contests completely eliminates a variety of data leakage present in historical contests. In particular, some participants in historical contests may use exogenous data causally connected with (or in some cases identical to) the contest data. Use of the exogenous data in an historical contest can make the models submitted by the participants worthless. Exemplary embodiments of the invention involving real time prediction contests do not have this disadvantage because use of exogenous data is a desirable objective that can enhance the predictive capability of the participant's solution. Real-time prediction contests free participants to use whatever ingenuity they possess in finding anything that can help them make better predictions, whether that means locating real-time sources of data or creating them from scratch.

Another advantage that can be provided by real time data prediction contests is the re-usability of contests. One contest can be used as a regressor for another, opening up options for combining and integrating solutions, as will be described further below. In their plurality, real-time contests can be described as a web of interrelated, bi-temporally indexed random variables available for use in the present without any modification: a canonical term structure for any desired prediction, as defined by the desired domain of application, e.g., a set of problems for which there is sufficient temporal or cross-sectional data that differentiation between good models and bad is possible on a reasonable time scale. Additionally, the internet of things (IoT) can be exploited to capture relevant sensor data in real time.

Another advantage that can be provided by exemplary embodiments of the invention is the ability to fragment tasks. Prediction tasks can be fragmented into smaller domains to improve accuracy and participation. For example, a contest to predict a stock market index over a long horizon would likely fall into the realm of traditional human oriented prediction markets and have no clear resolution. On the other hand, a contest to predict sales of individual items in hundreds of stores would be much more likely to unearth strong modeling approaches and sources of exogenous data. Hence, exemplary embodiments of the invention can be utilized to encourage the generation of strong models and data sources by fragmenting the tasks to a manageable size.

Other advantageous characteristics that can be provided by real time data prediction contests are timeliness and relevance. Real-time data prediction contests can provide an immediately usable product whose creation time depends on the amount of time it takes to accumulate enough data to differentiate contestants. Once created, the solutions generally do not lose statistical relevance. Contestants understand that in order to remain near the top of the leaderboard, and thus continue to receive compensation, they need to maintain their model and data sets so that they are timely and relevant. By contrast, the common task framework (CTF) in an historical data contest is primarily a research tool that has a long development time before it can be used commercially. With a historical data contest, there is a great divide between research and production, and due to timeliness of supplied regressors and rapidly changing business environments, a long running historical data contest may never directly impact the sponsor's business.

Another advantage that exemplary embodiments of the invention can provide is stability. Out of the intense and continuous competition comes stability, achieved through redundancy of the contestants and their solutions. If one successful participant ceases to provide answers, due to some unforeseen error in model or input data for example, it will make only a small difference to the ultimate consumer of the data because there are many other participants whose answers already contribute to the consensus. These aspects of a real time data prediction contest are not part of a typical software development life cycle and model review controls.

As noted earlier, exemplary embodiments of the invention can facilitating the process for defining a real time data prediction contest. For example, a potential sponsor of such a data contest can identify a source of updating data, such as might be available on a table in a web page or a public JSON page. Identification of the source of updating data may be much less involved than the process of setting up a traditional historical data contest, which typically involves both the collection of relevant curated data and contest design, including the avoidance of data leakage.

Real time data prediction contests may also provide the advantage of decreased costs. With increased accessibility of data predictions, more prediction and formalized decision making will be used. Increased access to crowd based prediction may result in a large amount of granular, individually tailored applications. As the availability of real-time random variables of high quality rises, the marginal cost of creating further forecasts on which these depend will drop significantly. Some low cost contests may be dominated by fully automated entries.

Real time data prediction contests also provide the advantage of enabling conditional prediction contests, including, for example, action-conditional forecasting for industrial control. Crowd-sourced conditional prediction may play a significant role in areas where control theory and reinforcement learning are now applied.

Additional components and features of exemplary embodiments of the invention will now be described, including design patterns that incorporate concepts from reinforcement learning, and utilize the creation of computation graphs that interweave and stack the contributions of different participants en route to an accurate real-time answer.

According to one embodiment of the invention, sub-contests may be used to enhance the effectiveness of a real time data prediction contest. Assume participant α in contest j receives a question at time $t_j^q$ and must reply with their answer by $t_j^a = t_j^q + \delta_j$. Arrival times $t_j^a$ are generally stochastic but not so the service response time $\delta_j$. The participant can establish a sub-contest k with question and answer times lying safely inside the interval $(t_j^q, t_j^a)$. For instance they can receive the question at $t_j^q$, post a sub-question at $t_k^q = t_j^q + \delta_j/10$, and require answers by $t_k^a = t_j^a - \delta_j/10$ which, upon receipt, can be combined with their own analysis to yield a response in time for the cutoff $t_j^a$ for the parent contest.

Participant α can assign prize-money for sub-contest k equal to some fraction of their own ongoing compensation in the top level contest j. This permits the participant to fragment the task in different ways according to their objectives and constraints. Participant β entering sub-contest k may have every reason to accept this arrangement even in the degenerate case where the sub-contest asks precisely the same question and participant α merely forwards participant β's answer verbatim. This is because contestant α might attach some added data such as lagged values, exogenous data, cleaned data or data comprising useful features to the question in the sub-contest, thereby saving β from time consuming work.

Alternatively, α may offer some other benefit such as free computation, curated library distribution, simple REST deployment or a desirable data science environment with back-testing capabilities. Failing that, participant α might merely provide superior marketing of the sub-contest than the parent or search engine optimization, or perhaps arrange superior access to an expert community.

As used herein, a "feature" generally refers to a submission to a contest that may be useful as a regressor but may not in and of itself constitute an unbiased estimate of the target. Features can be provided to participants in a number of ways. According to one embodiment, participants can buy features a la carte via a market mechanism adjacent to the contest. According to another embodiment, a meta-contest parametrized by a choice of link function (such as affine, rectified linear or logistic) can be implemented. The task of meta-contest participants is choosing how to use the link function to combine the most promising competition entries, and useful features, into an even more accurate response. A participant in this meta contest supplies a weight vector w, offset b and any other parameters as required by the link function. Their decision is based on the historical performance of contestants as they do not see the present values of entries until after the submission time $t_k^a$ of the child contest. The calculation is owned by the parent. This arrangement defends against the piracy concern: the participant entering the parent contest could easily enter the child contest.

Aside from improving the forecast in the spirit of ensemble methods, the weight contest may provide immediate transparency into the relative worth of features and entries submitted to the child contest—thereby boosting the efficiency of the feature market and, to use economic terms, helping to allocate resources to where they are, on the margin, most needed. Additionally, some entries in the child contest may themselves use sub-contests in which, once again, a blind weight meta-contest mechanic is employed. In this way combinations of contests may grow downward and begin to resemble neural networks. The perspective can be reversed. For example, if the participant begins with a well-trained deep network, establishing a weight contest could improve the final layer.

According to another embodiment, a contestant might arrange a subcontest to predict their own residuals. While superficially this is equivalent to supplying their entry as a feature, deep residual learning experience suggests that learning to hit zero can be easier than an arbitrary target. Here again the tree can extend downward. A contestant entering a residual contest can create their own residual subcontest and provide hints as to why they think their model can be improved. For example "I think my model is pretty good but my errors are high on long weekends." As participants sub-divide prediction or reconstitute it, they are slotting themselves into a "production line" version of prediction.

According to another embodiment of the invention, a "derivative" contest may use an underlying contest or exogenous market as target (i.e. solution). According to this embodiment, an action-conditional prediction contest is combined with an underlying unconditional contest, with the latter used to provide the target for the former. The underlying contest adopts the role played by a value function in reinforcement learning.

As one example, consider the optimization of baseball pitch choice and the following setup intended to solve this decision problem:

1. A prediction market for winning a baseball game, with continuous trading.
2. A underlying real-time data competition to predict end of innings win probability. At the end of each play contestants are asked to forecast the risk-neutral price immediately prior to the start of the next innings—as determined by the prediction market above.
3. A "derivative" real-time data competition to predict the post-play win probability (as defined by the consensus aggregate answer to the underlying contest above) conditional on pitch selection. Contestants are asked this question and respond before the play. They supply a vector as in Table 1 below.

TABLE 1

Sample response to an action-conditional prediction contest. The target is the post-play consensus game winning probability as defined by a second, underlying contest.

| Action | Response |
| --- | --- |
| Four-seam | 0.91 |
| Two-seam | 0.90 |
| Cutter | 0.90 |
| Forkball | 0.87 |
| Curveball | 0.93 |
| Slider | 0.85 |

The conditional contest may require all participants to provide forecasts for every eventuality, though in the example above there is a shortened pitch classification list for brevity. Contestants can only be assessed on one of their predictions because only one actual pitch is thrown. However it may be reasonable to assume that the predictive capability of participants carries over from one action choice to another.

Exemplary embodiments of the invention enable separation of concerns, in which participants with orthogonal expertise combine their skills. For example, one participant might have a firm grasp of game theory and possess great insight into the mixed strategy for pitch selection that trades off predictability versus exploitation. The participant may have some insight into the batter's psychological state or have an excellent model for game state transition conditional on successful contact with certain types of pitches. However, lack of an historical database might leave this same participant at a great disadvantage in predicting game results from post-play game states or end of innings scores. This baseline might best be provided by someone else participating in either the prediction market or the underlying end of play contest. The derivative contest does not require participants to estimate the probability of a particular action taken by the pitcher. This is analogous to the separation achieved by Q-learning.

According to another embodiment, temporal difference (TD) contests can be used. In this embodiment, the consensus crowd prediction in the underlying contest is denoted by $V(t_k)$, where $t_k$ indexes pitches. The prediction contest may be set up as follows:

1. A prediction market for winning a baseball game.
2. Underlying contest to predict end of innings win probability, as before. Responses are received after the k'th pitch and denoted $V(t_k)$.
3. Derivative (action conditional) contest to conditionally predict a weighted sum of temporal differences of future values of $V(t_k)$, in accordance with Formula 1 below. Rather than placing all the weight on the consensus after the very next pitch, the target is computed as:

$$G(t_k) = \frac{1-\lambda}{\lambda} \sum_{l=1}^{\infty} \lambda^k (V(t_{k+1}) - V(t_k)) \tag{1}$$

where $V(t_n)$ is defined as the current state of the underlying competition (aggregate forecast) after time state $t_n$ if the game has not finished, or equal to the game result if $t_n$ extends to the finish of the game.

As an analogy to temporal difference (TD) learning, the competition parameter $\lambda$ controls the degree to which we believe we can rely on the first competition as gospel, with $\lambda \rightarrow 0$ representing full confidence in the underlying market and $\lambda \rightarrow 1$ ignoring it completely.

TABLE 2

Labels for action-conditional contests analogous to temporal difference learning methods, and their targets.

| Contest | Effect | Target |
|---|---|---|
| TDC(1) | Underlying contest only | Distant future |
| TDC(0) | Underlying and derived | Next underlying |
| TDC($\lambda$) | Underlying and derived | Compromise |

A compromise value of between zero and one may prove better than either extreme, and delays in payment implied by Formula 1 above need not be excessive.

Additional examples will now be described for aggregating the participants' responses as well as compensating the participants.

Meta Contests. According to one embodiment, the system employs a meta contest in which the crowd is used to predict the best predictions of the crowd. That is, the crowd itself can be used to opine on the efficacy and future efficacy of participants, and also the manner in which the consensus is derived. A meta-competition may be analogous to a meta-parameter in a hierarchical model. It may straddle a plurality of contests to avoid circularity and manipulation. The particularities of the contest and participant can be omitted to encourage a crowd-search for generally applicable consensus calculations.

Point estimate contests. According to another embodiment, a point estimate contest may be utilized. In a point estimate contest, participant i supplies only a single number $x_i(t)$, perhaps contributing to a consensus estimate $\hat{x}(t)$ for the customer. When the truth corresponding to contests t=1, . . . , T is revealed, the running mean square error is $$MSE(T) = \frac{1}{|R_T|} \sum_{t \in R_T} e_t^2$$

where, for brevity of notation, $e_i(t) = x_i(t) - y(t)$. Due to delays in receiving the truth, this calculation may lag well behind. Here $R_T$ denotes the set of contests for which results are known at the time just prior to contest T. We can assign a consensus $$\hat{x}_T = \frac{\Sigma_i w_i(T) x_i(T)}{\Sigma_i w_i(T)}$$

using un-normalized weights $w_i(T)$. For example $w_i(T) = 1/MSE_i(F_T)$ where $$MSE_i(\mathcal{F}_T) = \sum_{t \in \mathcal{F}_T} (x_i(t) - y(t))^2$$

is the running mean square error for participant i's responses in contests who truth has been revealed thus far.

In time series contests, it may frequently be the case that errors $e_i(t)$ are serially correlated. One simple example is to down-weight contribution from participants with the highest serial correlation. There are other alternatives. For example, a simple, robust aggregation uses the median forecast from a high percentile sub-group of participants. Participants are compensated if they qualify for this calculation.

Likelihood Contests. According to another embodiment, a likelihood contest is utilized. In some contests participants respond with probability vectors for discrete outcomes. A means of scoring participants' entries is the posterior log-likelihood.

Implied Trading. According to another embodiment, a market inspired mathematical fiction may be used to determine compensation and aggregation. According to this embodiment, the real time data prediction system will:

1. Interpret participants' forecasts as wagers by augmenting them with an algorithmic optimal policy.
2. Use these fictitious wagers to clear the market, arrive at a risk neutral forecast, and also compensate participants.
3. Allow actual compensation to lag well behind (in time, and also in money by ensuring a draw-down to zero is highly unlikely).

Unlike prediction markets (e.g., actual financial markets), participants do not actually choose their wagers in this arrangement. They cannot ever lose actual money. And in no way can they be considered to be gambling. Market mechanisms are simply used in this embodiment to help elucidate the mathematics of their scoring, which might otherwise seem arbitrary. A concrete example is provided as follows.

Parimutuel Aggregation. The parimutuel system operates at most racetracks worldwide. Together with some laboratory economic assumptions, it motivates a scheme for both weighting forecasts and compensating participants. The parimutuel system simply allocates all wagered money to those who selected the winning horse (in proportion to amount bet, of course, and after a fee has reduced the pool). According to this embodiment, the participants are not wagering, merely doing data science, but as a convenient mathematical fiction their forecasts can be considered to be converted into bets in a systematic, disciplined manner.

Suppose I participants provide J probabilities. The parimutuel system provides incentive for log-optimal gamblers to bet directly in proportion to their subjective probabilities of each horse winning. For consistency, the notation Pij is used to denote the probability the i'th participant assigns to horse j and q the risk-neutral price that is identified with the aggregate forecast. The algorithm is shown in FIG. 11 and, as can be seen, involves matrix operations.

Real-time data contests can be viewed as an attempt to maintain the immediacy and incentives of a market mechanism without commingling prediction modeling with human decision making. Real-time contest design still generally needs a means of deriving a representative answer from the crowd responses and also a means of compensating participants who play a material role in its construction. These objectives can be met by building robotic investment decisions directly into the scoring mechanism. The setup then resembles a "robo-market" where participants have relinquished explicit investment decisions to an investment robot, though not the task of creating the estimates on which the automated investment decisions depend.

To further illustrate we make the mathematical observation is made, without proof, that a log-wealth maximizing investor constrained to wager all of their income on every event will invest on each outcome in proportion to their subjective beliefs. Since risk-neutral prices in a parimutuel market are proportional to aggregate investment, we can make the further observation that in a parimutuel robo-market the market probabilities are merely wealth-weighted combinations of the subjective beliefs of participants. Thus, finally, we make the observation that the market effects a linear model on the subjective beliefs of the participants. The coefficients of this linear model are synonymous with wealth and updates to the model are precisely the wealth changes one would observe, say, at a racetrack. This leads us to the method shown in Algorithm 1 in FIG. 11 which is an example, though by no means the only possible method, of determining both the compensation to participants and at the same time an crowd aggregate forecast q—the latter being the market clearing Arrow-Debreu price.

As described above, exemplary embodiments of the invention can utilize a REST-based protocol for competitive yet collaborative forecasting, and various design patterns can be used to further facilitate a division of labor in data gathering, feature generation, model selection, meta-modeling and ongoing performance analysis. Exemplary embodiment can provide an online, redundant, constantly updating and collectively computed computation graph culminating in the production of a consensus forecast for a large number of variables of interest.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers and personal computers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network 110 in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network 110 may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of servers 120, 142, 146, 162, 166 and personal computing devices 122, 124, 140, 144, 160, 164 are shown in FIG. 1, exemplary embodiments of the invention may utilize other types of communication devices whereby a user may interact with a network that transmits and delivers data and information used by the various systems and methods described herein. The personal computing devices 122, 124, 140, 144, 160, 164 may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices 122, 124, 140, 144, 160, 164 may include various connections such as a cell phone connection, WiFi connection, Bluetooth connection, satellite network connection, and/or near field communication (NFC) connection, for example.

As described above, FIG. 1 includes a number of servers and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices 122, 124, 140, 144, 160, 164. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented system for providing data science as a service (DSaaS) using a data prediction contest, the system comprising:
   a memory; and
   a computer processor that is programmed to:
   present a first interface comprising a consumer interface via a network, wherein the consumer interface allows a data consumer to (a) identify a subject data source having data fields that can be predicted, (b) specify at least one data field to be predicted, and (c) specify timing constraints and cost constraints on the prediction of the data fields;
   present, via the network, a second interface comprising a participant interface configured to present one or more competitions for selection by a participant, provide a web services interface that enables the participant to provide web services via the web services interface, wherein the web services can be called by the web services interface, the web services provide a prediction of the at least one data field, and the web services permit utilization of external data sources in generating the prediction, provide a space for entry of one or more functions written by the participant in a compatible computer language, provide a space for back-testing the one or more functions, and provide a space for offering to sell intellectual property rights to the one or more functions or the software code incorporating the one or more functions, and provide for the creation of a neural network by creating one or more combinations of contests where at least one of the contests comprising the one or more combinations of contests includes a participant selection of one of an affine function, a rectified linear function, and a logistic function combining the prediction of the at least one data field with one or more features, wherein each of the one or more features comprises a submission to a contest that may be useful as a regressor, but is not a prediction of the at least one data field;

identify a winning participant prediction among a plurality of participant predictions that provides the most accurate results for the subject data source;

generate a leaderboard, through the participant interface, configured to provide a list of data science contests, and upon selection of one of the data science contests from the list, display a list of participant names with a plurality of attributes comprising reputation, score, uptime, and share, wherein reputation comprises a measure of performance across all contests, score comprises a measure of performance in the selected data science contest, uptime comprises a percentage of questions answered in the selected data science contest, and share comprises total compensation paid, and further wherein the ranking of the list of participant names may be sorted by any of the plurality of attributes; and wherein the consumer interface is designed to transmit the prediction to the data consumer via the network.

2. The system of claim 1, wherein the subject data source comprises a website.

3. The system of claim 1, wherein the web services provide predictions for a plurality of contingent scenarios.

4. The system of claim 1, wherein the web services utilize a software model that has been previously used in an historical data science competition in which (a) only a defined, public data set is permitted to be used and (b) no external data sources are permitted to be used.

5. The system of claim 1, wherein the system is configured to provide the prediction according to a format, content, and timing specified by the data consumer.

6. The system of claim 1, wherein the web services comprise RESTful web services.

7. The system of claim 6, wherein the RESTful web services utilize an http protocol.

8. The system of claim 1, wherein the web services hosted by the participant employ a software-based model.

9. The system of claim 8, wherein the participants are permitted to maintain and improve the software-based model used to generate the prediction.

10. The system of claim 8, wherein the web services are programmed to call other web services in use of the software-based model.

11. The system of claim 1, wherein the web services comprises a REST API service that receives and responds to queries using a software-based model developed by the participant.

12. The system of claim 1, wherein the web services provide the prediction of the at least one data field in real time or near real time, and the system provides the prediction to the data consumer in real time or near real time.

13. The system of claim 1, wherein the system is designed to receive predictions from multiple participants and to generate a score for each of the predictions based on the quality of the prediction.

14. The system of claim 13, wherein the system is designed to compensate the participants based on the score.

15. The system of claim 1, wherein the system is designed to:

receive predictions from multiple participants;

aggregate some or all of the predictions from the multiple participants to generate an aggregated prediction; and transmit the aggregated prediction to the data consumer in real time or near real time.

16. The system of claim 15, wherein the aggregated prediction is generated using precision weighted averaging that treats a historical consensus as ground truth and weights the predictions by the inverse variance of the predictions to date.

17. The system of claim 1, wherein the web services interface allows the participants to provide predictions via interfaces to a plurality of model deployment tools.

18. The system of claim 1, wherein the consumer interface allows the data consumer to receive the predictions via a plurality of interfaces, including web page interfaces, a REST API, commercial software application, or mobile phone application.

19. The system of claim 1, wherein the data fields to be predicted comprise sales and the participants are required to predict sales conditional on a hypothetical choice of price.

20. A computer-implemented method for providing data science as a service (DSaaS) using a DSaaS system that implements a data prediction contest, the method comprising:

presenting a first interface comprising a consumer interface via a network, wherein the consumer interface allows a data consumer to (a) identify a subject data source having data fields that can be predicted, (b) specify at least one data field to be predicted, and (c) specify timing constraints and cost constraints on the prediction of the data fields;

presenting, via the network, a second interface comprising a participant interface configured to present one or more competitions for selection by a participant, provide a web services interface that enables the participant to provide web services via the web services interface, wherein the web services can be called by the web services interface, the web services provide a prediction of the at least one data field, and the web services permit utilization of external data sources in generating the prediction, provide a space for entry of one or more functions written by the participant in a compatible computer language, provide a space for back-testing the one or more functions, and provide a space for offering to sell intellectual property rights to the one or more functions or the software code incorporating the one or more functions, and provide for the creation of a neural network by creating one or more combinations of contests where at least one of the contests comprising the one or more combinations of contests includes a participant selection of one of an affine function, a rectified linear function, and a logistic function combining the prediction of the at least one data field with one or more features, wherein each of the one or more features comprises a submission to a contest that may be useful as a regressor, but is not a prediction of the at least one data field;

identifying a winning participant prediction among a plurality of participant predictions that provides the most accurate results for the subject data source;

generating a leaderboard, through the participant interface, configured to provide a list of data science contests, and upon selection of one of the data science contests from the list, display a list of participant names with a plurality of attributes comprising reputation, score, uptime, and share, wherein reputation comprises a measure of performance across all contests, score comprises a measure of performance in the selected data science contest, uptime comprises a percentage of questions answered in the selected data science contest, and share comprises total compensation paid, and further wherein the ranking of the list of participant names may be sorted by any of the plurality of attributes;

transmitting, by the consumer interface, the prediction to the data consumer via the network.

* * * * *